United States Patent
Nalluri et al.

(10) Patent No.: US 9,694,829 B2
(45) Date of Patent: Jul. 4, 2017

(54) DEVICE FOR CONTROLLING STIFFNESS AND DAMPING OF LOCOMOTIVE CARBODIES

(71) Applicant: Electro-Motive Diesel, Inc., LaGrange, IL (US)

(72) Inventors: Butchi Babu Nalluri, Naperville, IL (US); Saket Ashokkumar Mishra, Burr Ridge, IL (US); Xiaoying Ma, Chicago, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 148 days.

(21) Appl. No.: 14/575,268

(22) Filed: Dec. 18, 2014

(65) Prior Publication Data

US 2016/0176415 A1   Jun. 23, 2016

(51) Int. Cl.
  *B61D 17/00*   (2006.01)
  *F16F 15/08*   (2006.01)
  *B61C 17/00*   (2006.01)
  *F16F 3/087*   (2006.01)

(52) U.S. Cl.
  CPC .............. *B61D 17/00* (2013.01); *B61C 17/00* (2013.01); *F16F 3/0876* (2013.01); *F16F 15/08* (2013.01)

(58) Field of Classification Search
  CPC ...... F16F 7/00; F16F 2230/007; F16F 13/101; F16F 13/24; F16F 3/0876; F16F 15/08; B61D 17/00; B61D 15/06; B61D 17/045; B61D 45/008; B61C 17/00; B62D 33/0604; B62D 27/04; B62D 24/02; B62D 21/11; B62D 24/04; B60K 5/1208

USPC .............. 105/453, 454, 456, 395.5, 9, 8.1, 3
  See application file for complete search history.

(56) References Cited

U.S. PATENT DOCUMENTS

| | | | | |
|---|---|---|---|---|
| 6,267,062 | B1 * | 7/2001 | Hamilton, Jr. | B61C 7/04 105/26.05 |
| 7,421,952 | B2 * | 9/2008 | Taylor | B61D 15/02 104/2 |
| 8,176,854 | B2 * | 5/2012 | Smith, Jr. | B61O 5/02 105/26.05 |

(Continued)

FOREIGN PATENT DOCUMENTS

| | | |
|---|---|---|
| CN | 1525918 | 9/2004 |
| EP | 0975502 | 2/2000 |
| IN | 201104065 P2 | 6/2012 |

*Primary Examiner* — Mark Le

(57) ABSTRACT

A device for damping vibrations between a pair of sub-structural components of a carbody in a locomotive is provided. The sub-structural components are supported on a single undercarriage frame. The device includes a first support bracket affixed to a first sub-structural component, and a second support bracket that is interleaved with the first support bracket and affixed to a second sub-structural component. The device further includes a first stiffening element and a second stiffening element that are disposed on the first support bracket and in opposing relation to each other. The device further includes a reciprocating member that is rigidly connected to the second support bracket. The reciprocating member is movable between the first stiffening element and the second stiffening element to abut against one of the first stiffening element and the second stiffening element in response to a relative movement between the pair of sub-structural components of the carbody.

17 Claims, 4 Drawing Sheets

(56) References Cited

U.S. PATENT DOCUMENTS

| | | |
|---|---|---|
| 8,201,503 B2 | 6/2012 | Huppert et al. |
| 8,365,930 B2 | 2/2013 | Carlstedt |
| 2014/0265075 A1* | 9/2014 | Gottschalk ......... B62D 33/0604 267/141 |

* cited by examiner

DEVICE FOR CONTROLLING STIFFNESS AND DAMPING OF LOCOMOTIVE CARBODIES

TECHNICAL FIELD

The present disclosure relates to a device for improving or controlling the stiffness of a carbody in a locomotive. More particularly, the present disclosure relates to a device for dampening vibrations within sub-structural components of the carbody.

BACKGROUND

Typically, a carbody of a locomotive is supported on a single undercarriage frame. The undercarriage frame may in turn be supported on axles or bogies having springs disposed thereon. The carbody together with the undercarriage frame is subject to vibrations from movement of wheels on uneven tracks, for e.g., on tracks riddled with gaps therein. During such vibrations, the undercarriage frame may undergo bending.

European Patent 0 975 502 B1 (hereinafter referred to as the '502 patent) discloses that the natural frequency of a carbody of a railway vehicle is increased by separating a part mass dynamically from the carbody. However, previously known systems such as, but not limited to, the '502 patent do not disclose damping of vibrations from relative movement of sub-structural components in the locomotive and converting non-structural carbody of a locomotive into controlled structural carbody.

Hence, there is a need for a device that converts non-structural carbody of a locomotive into controlled structural carbody to damp vibrations arising from movement of the undercarriage frame and also from the relative movement between the sub-structural components of carbody disposed on the undercarriage frame.

SUMMARY OF THE DISCLOSURE

In one aspect of the present disclosure, a device for damping vibrations between adjacent pairs of sub-structural components of a carbody in a locomotive is disclosed. The sub-structural components of carbody in the locomotive are supported on a single undercarriage frame. The device includes a first support bracket affixed to a first sub-structural component, and a second support bracket that is interleaved with the first support bracket and affixed to a second sub-structural component.

The device further includes a first stiffening element and a second stiffening element that are disposed on the first support bracket and in opposing relation to each other. In an aspect of the present disclosure, the first and second stiffening elements are made up of an elastomeric material. Moreover, a thickness of the elastomeric material is in the range of about 10 millimeters to 200 millimeters. Moreover, a damping element may also be applied in parallel to each stiffening element.

The device further includes a reciprocating member that is rigidly connected to the second support bracket. The reciprocating member is movable between the first stiffening element and the second stiffening element to abut against one of the first stiffening element and the second stiffening element in response to a relative movement between the pair of sub-structural components of the carbody.

In an aspect of the present disclosure, the reciprocating member includes a rod and a plate. The rod is rigidly connected to the second support bracket and threadably engaged with the plate. The plate is disposed between the first and second damping elements. Moreover, a thickness of the plate is lesser than a distance between the first and second damping elements so as to define an air gap therebetween. In an aspect of the present disclosure, the air gap is in the range of about 0.1 millimeters to 20 millimeters.

In another aspect of the present disclosure, the device may include a biasing member coupled to the rod of the reciprocating member. The biasing member includes a nut that is threadably engaged partway along the rod, and a spacer element disposed about the rod. The spacer element extends between the nut and the plate and is disposed in rigid abutment with the nut and the plate.

In another aspect of the present disclosure, a method of damping vibrations between a pair of sub-structural components of a carbody in a locomotive includes rigidly affixing a first support bracket to a first sub-structural component of the carbody. The method further includes interleaving a second support bracket with the first support bracket and rigidly connecting the second support bracket to a second sub-structural component of the carbody. The method further includes providing a first stiffening element and a second stiffening element on the first support bracket and in opposing relation to each other. The method further includes rigidly connecting a reciprocating member to the second support bracket such that the reciprocating member is movable between the first and second stiffening elements to abut against one of the first stiffening element and the second stiffening element in response to a relative movement between the first and second sub-structural components of the carbody.

Other features and aspects of this disclosure will be apparent from the following description and the accompanying drawings.

DETAILED DESCRIPTION

Wherever possible, the same reference numbers will be used throughout the drawings to refer to same or like parts. Moreover, references to various elements described herein are made collectively or individually when there may be more than one element of the same type. However, such references are merely exemplary in nature. It may be noted that any reference to elements in the singular is also to be construed to relate to the plural and vice-versa without limiting the scope of the disclosure to the exact number or type of such elements unless set forth explicitly in the appended claims.

Figure 1:
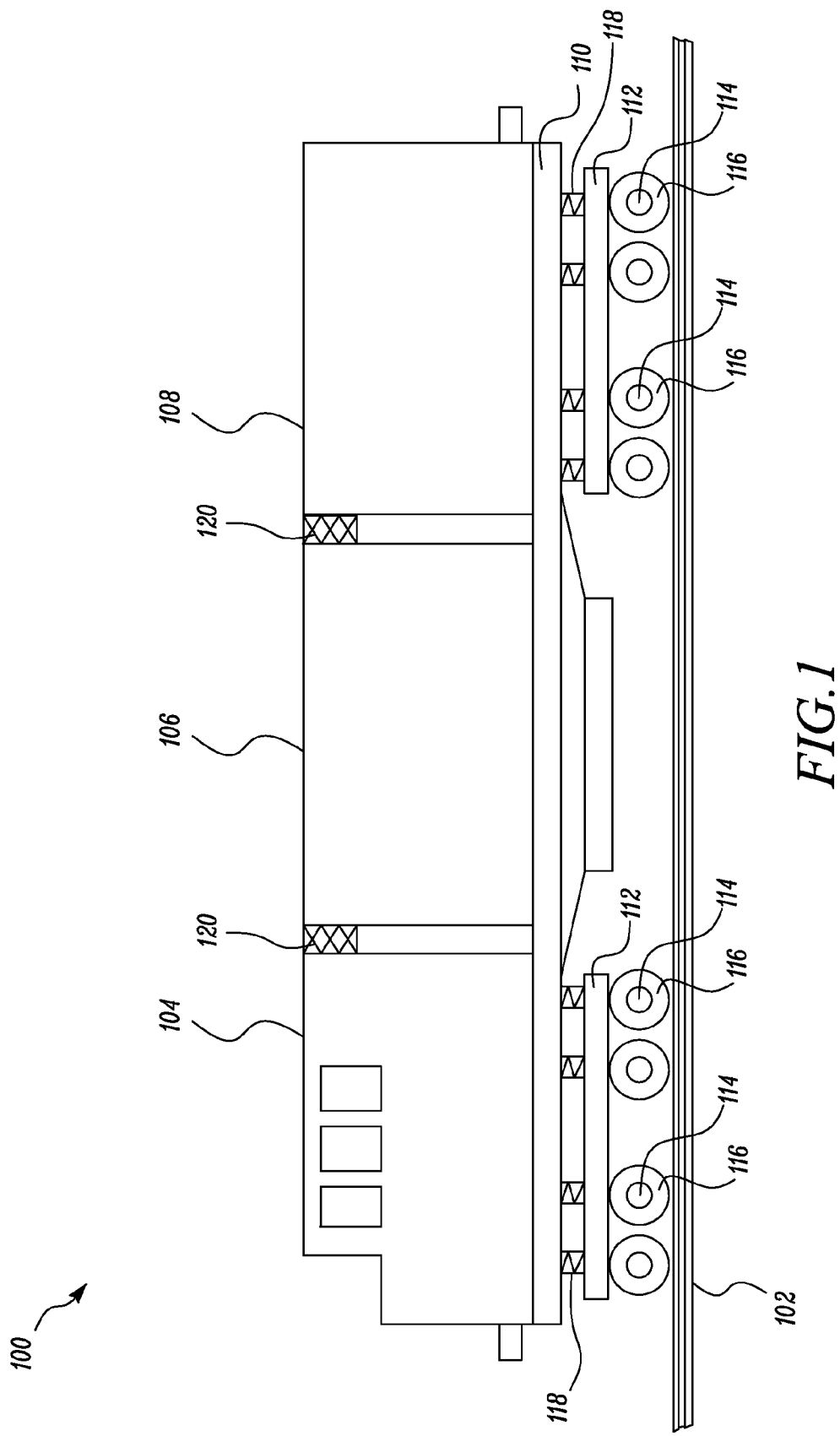
FIG. 1 is a diagrammatic illustration of an exemplary locomotive showing a carbody in accordance with an embodiment of the present disclosure.

FIG. 1 shows an exemplary locomotive 100 that is configured to run on rails 102. As shown, the locomotive 100 includes a first sub-structural component 104 of a carbody, a second sub-structural component 106 of the carbody, and a third sub-structural component 108 of the carbody. In the illustrated embodiment of FIG. 1, the first sub-structural component 104 of the carbody is embodied in the form of an engine hood, the second sub-structural component 106 of the carbody is embodied in the form of a generator hood, and the third sub-structural component 108 of the carbody is embodied in the form of a cooling hood. However, the first, second, and third sub-structural components 104, 106, 108 of the carbody may be embodied in any type of rail cars known to one skilled in the art without deviating from the spirit of the present disclosure.

The first, second, and third sub-structural components 104, 106, 108 of the carbody are being supported on a single undercarriage frame 110 of the locomotive 100. This undercarriage frame 110 is coupled to a bogie structure 112 (two bogie structures 112 shown in the illustrated embodiment of FIG. 1) that includes a plurality of axles 114 on which wheels 116 are rotatably supported. The undercarriage frame 110 may be coupled to the bogie structure 112 using multiple suspension systems 118, for e.g., but not limited to, coil springs, as shown in FIG. 1.

Although the present disclosure discloses three sub-structural components of a carbody—the first sub-structural component 104, the second sub-structural component 106, and the third sub-structural component 108, explanation rendered hereinafter will be made in conjunction with the first sub-structural component 104 and the second sub-structural component 106. However, it should be noted that such explanation can be similarly applied to the second sub-structural component 106 and the third sub-structural component 108 for the purposes of understanding the present disclosure.

The present disclosure relates to a device 120 for converting 'non-structural' carbodies into 'controlled' structural carbodies by damping vibrations between adjacent sub-structural components of a carbody of a locomotive. As shown in the illustrated embodiment of FIG. 1, two devices 120 are provided in the exemplary locomotive 100—one device 120 is connected between the first and second sub-structural components 104, 106 of the carbody while another device 120 is connected between the second and third sub-structural components 106, 108 of the carbody. Moreover, the terms 'non-structural' carbody used herein refers to a carbody that is not configured to absorb or withstand operational forces or loads arising from movement of the locomotive 100. The term 'controlled' structural carbody, as disclosed herein, can be regarded as a carbody that is configured to damp vibrations at the time of occurrence. Further, a pair of adjacently located 'controlled' sub-structural components of a carbody may be disconnected by mass from each other during the absence of vibrations, or when there is no relative movement between the adjacently located sub-structural components of the carbody, explanation to which will be made later herein.

Figure 2:
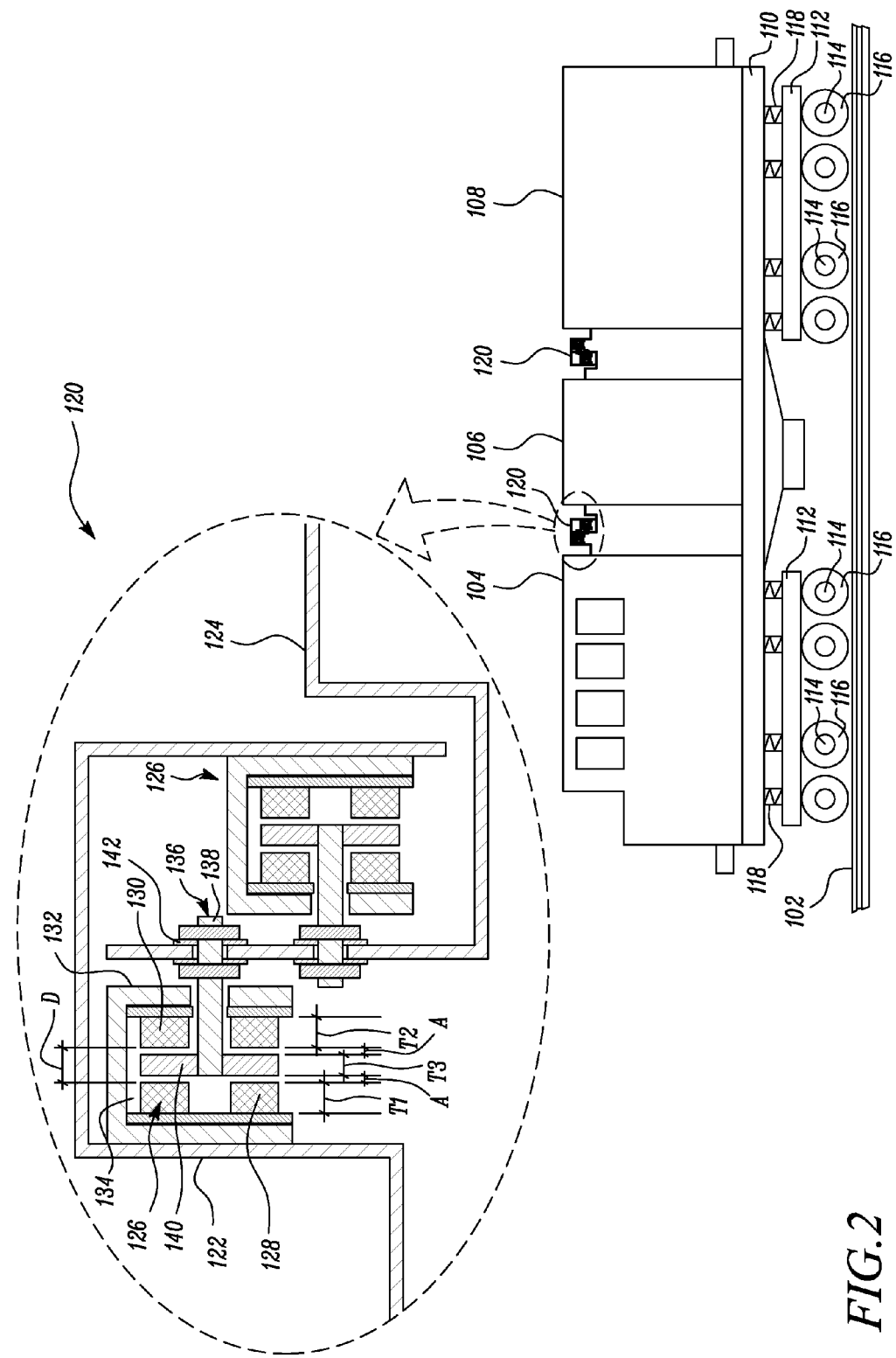
FIG. 2 is a diagrammatic illustration of the exemplary locomotive showing a device in accordance with an embodiment of the present disclosure to damp vibrations between a pair of sub-structural components of the carbody.

Referring to FIG. 2, the device 120 includes a first support bracket 122 rigidly affixed to the first sub-structural component 104. The device 120 further includes a second support bracket 124 that is interleaved with the first support bracket 122 and rigidly connected to the second sub-structural component 106. As shown, the first support bracket 122 and the second support bracket 124 are disposed in an inverted U-type and a U-type configuration respectively so as to be at least partially interleaved with each other.

The device 120 further includes a stiffening assembly 126 (two stiffening assemblies shown in the illustrated embodiment of FIG. 2). Although two stiffening assemblies are shown in the illustrated embodiment of FIG. 2, it will be appreciated that the device 120 may be optionally implemented with lesser or more number of stiffening assemblies therein. The number of stiffening assemblies employed in the device 120 may vary from one application to another depending on specific requirements of the associated application. Also, in parallel to the stiffening assemblies 126, a motion dampening device (not shown) can be applied.

Each stiffening assembly 126 includes a first stiffening element 128, and a second stiffening element 130. The first stiffening element 128 is disposed on the first support bracket 122. The second stiffening element 130 is disposed on the first support bracket 122 and in opposing relation to the first stiffening element 128. As shown in the illustrated embodiment of FIG. 2, the stiffening assembly 126 additionally includes a three-sided structural member 132 that defines a pocket 134 therebetween. The structural member 132 is configured to allow the first stiffening element 128 and the second stiffening element 130 to be disposed on mutually opposing sides thereof.

In various embodiments of the present disclosure, the first and second stiffening elements 128, 130 may be beneficially made up of an elastomeric material to absorb vibrations arising from relative movement between the first and second sub-structural components 104, 106. The elastomeric material may be, for e.g., rubber. Although rubber is disclosed herein, it can be optionally contemplated to use other materials in lieu of rubber to form the first and second stiffening elements 128, 130. Moreover, one of ordinary skill in the art will appreciate that a type, grade, or configuration of elastomeric materials used in forming the first and second stiffening materials may be similar or dissimilar to suit various requirements of an application.

Additionally, with reference to the present disclosure, a thickness T1 of the first stiffening element 128 and a thickness T2 of the second stiffening element 130 may be in the range of about 10 millimeters to 200 millimeters. In one embodiment, the thicknesses T1, T2 for each of the first and second stiffening elements 128, 130 may be 50 mm. In another embodiment, the thickness T1 of the first stiffening element 128 may be 40 mm and the thickness T2 of the second stiffening element 130 may be 80 mm. Therefore, it may be further noted that the thicknesses T1, T2 of the first stiffening element 128 and the second stiffening element 130 may be similar or dissimilar depending on specific requirements of an application.

The device 120 further includes a reciprocating member 136 rigidly connected to the second support bracket 124. The reciprocating member 136 is movable between the first stiffening element 128 and the second stiffening element 130 to abut against one of the first stiffening element 128 and the second stiffening element 130 in response to a relative movement of the pair of sub-structural components 104, 106.

In the illustrated embodiment of FIG. 2, the reciprocating member 136 includes a rod 138 and a plate 140. As shown, the rod 138 is rigidly connected to the second support bracket 124 and threadably engaged with the plate 140. As such, the rod 138 itself is threaded on its outer surface (not shown) and the plate 140 is provided with a threaded receptacle (not shown) at its centre to facilitate the mutual engagement of the rod 138 to the plate 140. Further, the plate 140 is disposed between the first and second damping elements 128, 130. The plate 140 may be a steel plate 140 or a plate 140 that is formed from any other type of substantially non-deformable material known to one skilled in the art.

Additionally, as shown in FIG. 2, a thickness T3 of the plate 140 is kept lesser than a distance D between the first and second stiffening elements 128, 130 so as to define an air gap A therebetween. In an embodiment of the present disclosure, the air gap A is in the range of about 0.1 millimeters (mm) to 20 millimeters (mm), for e.g., 3 mm. However, it may be noted that the air gap A of 0.1 mm to 20 mm is exemplary in nature and non-limiting of this disclosure. The amount of air gap A between the plate 140 and the first and second stiffening elements 128, 130 may vary from one application to another without deviating from the spirit of the present disclosure. Therefore, one of ordinary skill in the art can beneficially contemplate 140 selecting the amount of air gap A defined between the plate 140 and the first and second stiffening elements 128, 130 to suit specific requirements of an application.

Figure 3:
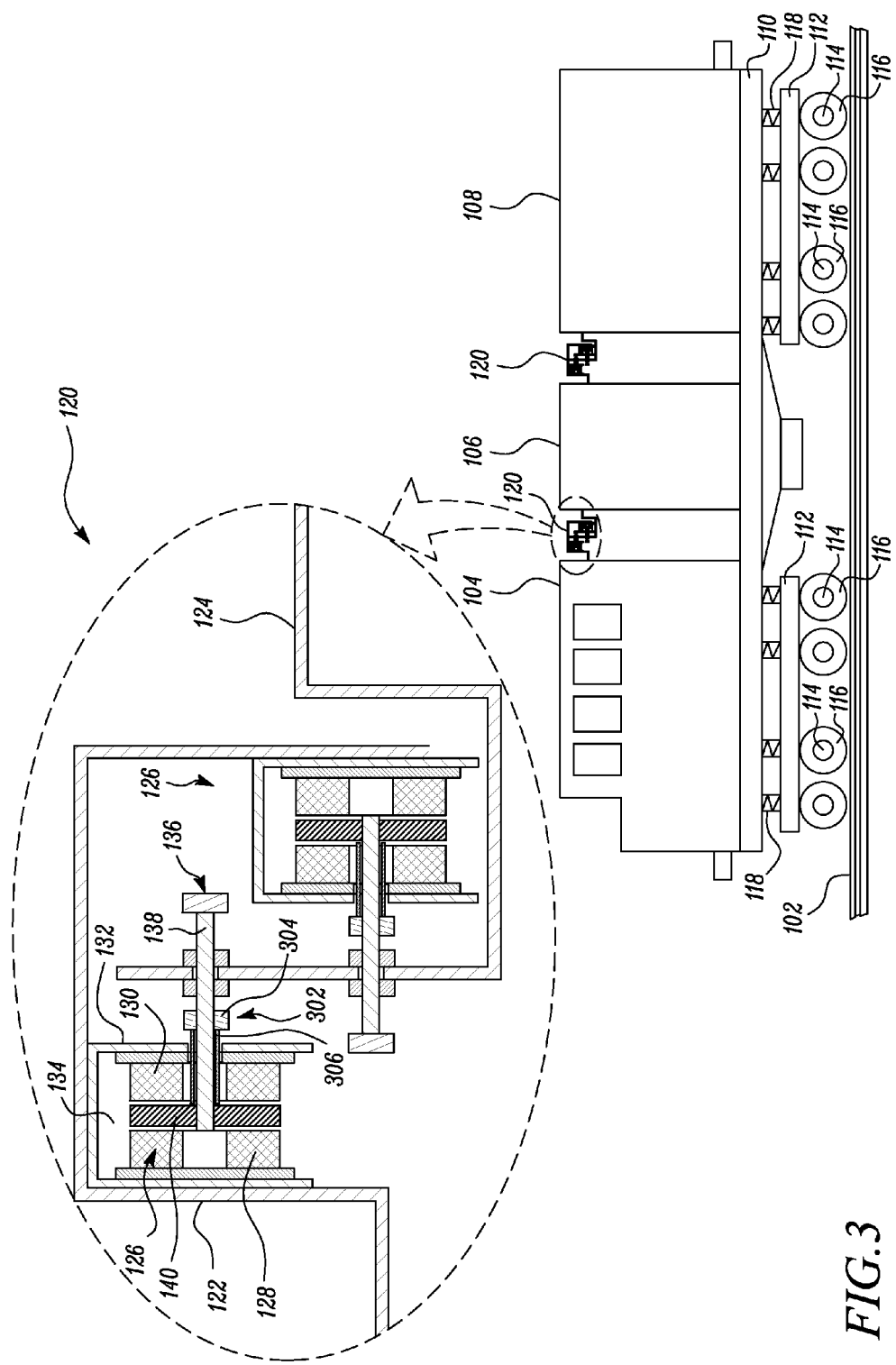
FIG. 3 is a diagrammatic illustration of the locomotive employing the device in accordance with another embodiment of the present disclosure.

Referring to FIG. 3, in another embodiment, the device 120 may further include a biasing member 302 coupled to the rod 138 of the reciprocating member 136. As shown, the biasing member 302 may include a nut 304 that is threadably engaged partway along the rod 138, and a spacer element 306 that is disposed about the rod 138 to extend between the nut 304 and the plate 140. The spacer element 306 is configured to be disposed in rigid abutment with the nut 304 and the plate 140. The biasing member 302 provides a certain amount of tension force to be maintained between the rod 138 and the plate 140 by biasing the plate 140 away from the rod 138.

Although specific configurations of the stiffening assembly 126 are disclosed in various embodiments herein, the stiffening assembly 126 may additionally include other elements such as, but not limited to, washers 142 (See FIG. 2), and other components that are suitably implemented to accomplish the functioning of the device 120. Further, there may be more or lesser number of components than that disclosed herein depending on specific requirements of an application. For example, in the illustrated embodiments of FIGS. 2 and 3, although two stiffening elements 128, 130 are included in each device 120, the scope of the device 120 may extend to include fewer or more number of stiffening assemblies as may be required to damp the vibrations from relative movement between the first and second sub-structural components 104, 106 of the carbody. Therefore, it should be noted that the type of components and the specific number if any, is merely exemplary in nature and hence, non-limiting of this disclosure.

Various embodiments disclosed herein are to be taken in the illustrative and explanatory sense, and should in no way be construed as limiting of the present disclosure. All directional references (e.g., axial, radial, above, below, upper, lower, top, bottom, vertical, horizontal, inward, outward, upward, downward, left, right, leftward, rightward, L.H.S, R.H.S, clockwise, and counter-clockwise) are only used for identification purposes to aid the reader's understanding of the present disclosure, and may not create limitations, particularly as to the position, orientation, or use of the systems and/or methods disclosed herein. Joinder references (e.g., attached, affixed, coupled, engaged, connected, and the like) are to be construed broadly. Moreover, such joinder references do not necessarily infer that two elements are directly connected to each other.

Additionally, all numerical terms, such as, but not limited to, "first", "second", "third", or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

Figure 4:
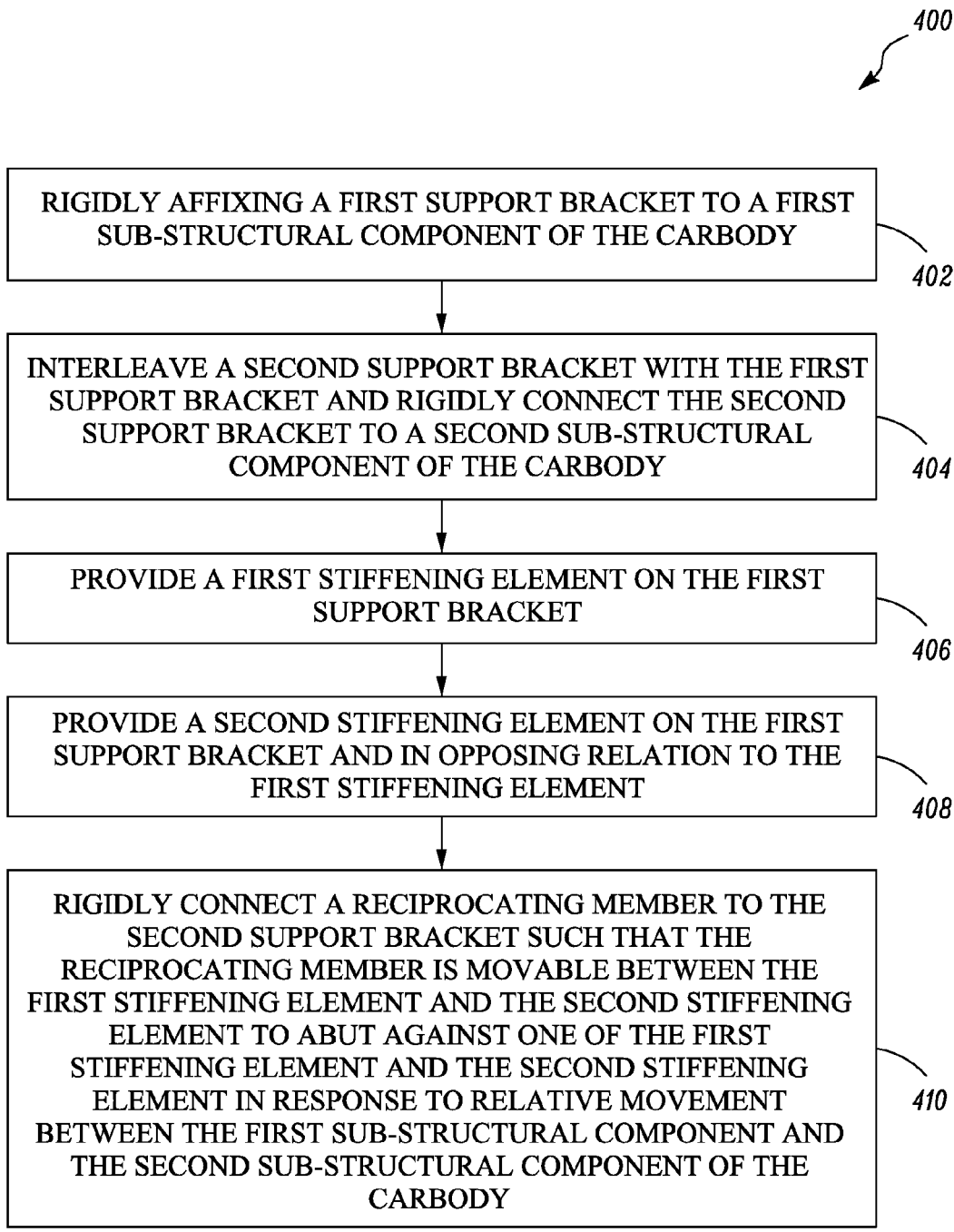
FIG. 4 is a flowchart illustrating a method for damping vibrations between the pair of sub-structural components of the carbody in accordance with an embodiment of the present disclosure.

FIG. 4 shows a method 400 of damping vibrations between the pair of sub-structural components 104, 106 of a carbody in the locomotive 100. At step 402, the method 400 includes rigidly affixing the first support bracket 122 to the first sub-structural component 104 of the carbody. At step 404, the method 400 further includes interleaving the second support bracket 124 with the first support bracket 122, and rigidly connecting the second support bracket 124 to the second sub-structural component 106 of the carbody of the locomotive 100. At step 406, the method 400 further includes providing the first stiffening element 128 on the first support bracket 122. At step 408, the method 400 further includes providing the second stiffening element 130 on the first support bracket 122 and in opposing relation to the first support bracket 122.

At step 410, the method 400 further includes rigidly connecting the reciprocating member 136 to the second support bracket 124 such that the reciprocating member 136 is movable between the first stiffening element 128 and the second stiffening element 130. The reciprocating member 136 is configured to abut against one of the first stiffening element 128 and the second stiffening element 130 in response to a lateral movement between the first sub-structural component 104 of the carbody and the second sub-structural component 106 of the carbody.

In providing the reciprocating member 136, the method 400 includes providing the plate 140 between the first and second stiffening elements 128, 130, rigidly connecting a first end of the rod 138 to the second support bracket 124; and threadably engaging the second end of the rod 138 with the plate 140.

In an embodiment, the method 400 may include additionally coupling the biasing member 302 to the rod 138 of the reciprocating member 136. As disclosed earlier herein, the biasing member 302 includes the nut 304 that is threadably engaged partway along the rod 138, and the spacer element 306 that is disposed about the rod 138 to extend between the nut 304 and the plate 140. The spacer element 306 is configured to be disposed in rigid abutment with the nut 304 and the plate 140.

In methodologies directly or indirectly set forth herein, various steps and operations are described in one possible order of operation, but those skilled in the art will recognize that steps and operations may be re-arranged, replaced, or eliminated without departing from the spirit and scope of the present disclosure as set forth in the claims.

Embodiments of the present disclosure have applicability for use and implementation in locomotives where multiple 'non-structural' components of a carbody are disposed on a single undercarriage frame. In such configurations, it has been observed that with movement of the locomotive on uneven rails or rails that are riddled with gaps therein, the sub-structural components of the carbody experience relative movement with respect to each other, i.e., towards and away from one another.

With implementation of the embodiments disclosed herein, manufacturers of locomotives can conveniently convert a 'non-structural' carbody into a 'controlled' carbody, wherein the carbody is capable of preventing a significant amount of bending in the undercarriage frame 110 when the locomotive 100 runs over uneven rails 102. The device 120 of the present disclosure increases the amount of stiffness in the locomotive 100 and the sub-structural components 104, 106 of a carbody therein. As the device 120 is configured to counteract the resilience of the suspension systems 118 between the undercarriage frame 110 and the bogie structure 112, the device 120 prevents the bending of the undercarriage frame 110 when the locomotive 100 runs on uneven rails.

With use of the device 120 disclosed herein, the undercarriage frame 110 can beneficially support more weight thereon as compared to a locomotive consist without the device 120 of the present disclosure. Also, the device 120 helps the undercarriage frame 110 to experience lesser fatigue and bending over a prolonged period of time and use, thereby prolonging a service life of the undercarriage frame 110.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A device for damping vibrations between a pair of sub-structural components of a carbody in a locomotive, the sub-structural components of the carbody being supported on a single undercarriage frame of the locomotive, the device comprising:
    a first support bracket rigidly affixed to a first sub-structural component of a carbody;
    a second support bracket interleaved with the first support bracket and rigidly connected to a second sub-structural component of the carbody;
    a stiffening assembly comprising:
        a first stiffening element disposed on the first support bracket;
        a second stiffening element disposed on the first support bracket and in opposing relation to the first stiffening element; and
        a reciprocating member rigidly connected to the second support bracket, the reciprocating member movable between the first stiffening element and the second stiffening element to abut against one of the first stiffening element and the second stiffening element in response to a relative movement of the pair of sub-structural components of the carbody,
        wherein the reciprocating member includes a rod and a plate, wherein the rod is rigidly connected to the second support bracket and threadably engaged with the plate, and wherein the plate is disposed between the first and second stiffening elements.

2. The device of claim 1 further comprising a biasing member coupled to the rod of the reciprocating member, the biasing member comprising:
    a nut threadably engaged partway along the rod;
    a spacer element disposed about the rod and extending between the nut and the plate, the spacer element configured to be disposed in rigid abutment with the nut and the plate.

3. The device of claim 1, wherein a thickness of the plate is lesser than a distance between the first and second stiffening elements so as to define an air gap therebetween.

4. The device of claim 3, wherein the air gap is in the range of about 0.1 millimeters to 20 millimeters.

5. The device of claim 1, wherein the first and second stiffening elements are made up of an elastomeric material.

6. The device of claim 1, wherein a thickness of the first stiffening element and a thickness of the second stiffening element are in the range of about 10 millimeters to 200 millimeters.

7. A locomotive comprising:
    at least one carbody comprising:
        a first sub-structural component;
        a second sub-structural component disposed adjacent to the first sub-structural component;
        a first support bracket rigidly affixed to the first sub-structural component;
        a second support bracket interleaved with the first support bracket and rigidly connected to the second sub-structural component; and
        a stiffening assembly comprising:
            a first stiffening element disposed on the first support bracket;
            a second stiffening element disposed on the first support bracket and in opposing relation to the first stiffening element; and
            a reciprocating member rigidly connected to the second support bracket, the reciprocating member movable between the first stiffening element and the second stiffening element to abut against one of the first stiffening element and the second stiffening element in response to relative movement between the first and second sub-structural components of the carbody,
            wherein the reciprocating member includes a rod and a plate, wherein the rod is rigidly connected to the second support bracket and threadably engaged with the plate, and wherein the plate is disposed between the first and second stiffening elements.

8. The locomotive of claim 7, wherein the first sub-structural component and the second sub-structural component are being supported on a single undercarriage frame of the locomotive.

9. The locomotive of claim 7, wherein the first sub-structural component is one of a generator component and an engine component.

10. The locomotive of claim 7, wherein the second sub-structural component is one of an engine component and a cooling hood component of the locomotive.

11. The locomotive of claim 7, further comprising a biasing member coupled to the rod of the reciprocating member, the biasing member comprising:
    a nut threadably engaged partway along the rod;

a spacer element disposed about the rod and extending between the nut and the plate, the spacer element configured to be disposed in rigid abutment with the nut and the plate.

12. The locomotive of claim 7, wherein the plate is disposed between the first and second stiffening elements, and wherein a thickness of the plate is lesser than a distance between the first and second stiffening elements so as to define an air gap therebetween.

13. The locomotive of claim 12, wherein the air gap is in the range of about 0.1 millimeters to 20 millimeters.

14. The locomotive of claim 7, wherein a thickness of the first stiffening element and a thickness of the second stiffening element are in the range of about 10 millimeters to 200 millimeters.

15. A method of damping vibrations between a pair of sub-structural component of a carbody in a locomotive, the pair of sub-structural components being supported on a single undercarriage frame of the locomotive, the method comprising:
    rigidly affixing a first support bracket to a first sub-structural component of the carbody;
    interleaving a second support bracket with the first support bracket and rigidly connecting the second support bracket to a second sub-structural component of the carbody;
    providing a first stiffening element disposed on the first support bracket;
    providing a second stiffening element disposed on the first support bracket and in opposing relation to the first stiffening element; and
    rigidly connecting a reciprocating member to the second support bracket such that the reciprocating member is movable between the first stiffening element and the second stiffening element to abut against one of the first stiffening element and the second stiffening element in response to relative movement between the first sub-structural component and the second sub-structural component of the carbody,
    wherein the rigidly connecting the reciprocating member to the second support bracket comprises:
    providing a plate between the first and second stiffening elements,
    rigidly connecting a first end of a rod to the second support bracket, and
    threadably engaging a second end of the rod with the plate.

16. The method of claim 15, wherein a thickness of the plate is lesser than a distance between the first and second stiffening elements so as to define an air gap of about 0.1 millimeters to 20 millimeters between the plate and at least one of the first and second stiffening elements.

17. The method of claim 15 further comprising providing a biasing member coupled to the rod of the reciprocating member, wherein the biasing member comprises:
    a nut threadably engaged partway along the rod; and
    a spacer element disposed about the rod and extending between the nut and the plate, the spacer element configured to be disposed in rigid abutment with the nut and the plate.

* * * * *